United States Patent [19]

Takeda et al.

[11] Patent Number: 4,694,349

[45] Date of Patent: Sep. 15, 1987

[54] LIQUID CRYSTAL MATRIX DISPLAY PANEL DRIVER CIRCUIT

[75] Inventors: Makoto Takeda, Tenri; Kunihiko Yamamoto, Nara; Nobuaki Matsubayashi, Tenri; Hiroshi Take, Ikoma, all of Japan

[73] Assignee: Sharp Kabushiki Kaisha, Osaka, Japan

[21] Appl. No.: 739,849

[22] Filed: May 31, 1985

[30] Foreign Application Priority Data

Jun. 1, 1984 [JP] Japan ................................ 59-113744

[51] Int. Cl.[4] .......................... H04N 3/14; H04N 5/66
[52] U.S. Cl. .................................... 358/241; 358/236; 340/784
[58] Field of Search ............... 358/241, 236, 230, 140, 358/59; 340/784, 805, 802, 811; 350/332, 333

[56] References Cited

U.S. PATENT DOCUMENTS

| | | | |
|---|---|---|---|
| 4,400,719 | 8/1983 | Powers | 358/140 |
| 4,447,812 | 5/1984 | Soneda | 358/241 |
| 4,509,071 | 4/1985 | Fujimura et al. | 358/140 |
| 4,511,926 | 4/1985 | Crossland | 358/236 |
| 4,539,592 | 9/1985 | Tanaka et al. | 358/140 |

Primary Examiner—Tommy P. Chin
Attorney, Agent, or Firm—Birch, Stewart Kolasch, & Birch

[57] ABSTRACT

A driver circuit for a matrix-type liquid crystal display panel capable of displaying pictures having the same number of scan lines as a conventional television set without using a frame memory, by applying the mean value of two video signals matching the 1-H advance and 1-H behind odd (even) numbered scan lines, where the video signal in the odd (even) field correctly matches the even (odd) numbered scan lines.

3 Claims, 12 Drawing Figures

LIQUID CRYSTAL MATRIX DISPLAY PANEL DRIVER CIRCUIT

BACKGROUND OF THE INVENTION

1. Field of the Invention

The present invention relates to a matrix-type liquid crystal display panel, more particularly, to the driver circuit of the TV picture display unit incorporating a matrix-type liquid crystal display panel provided with a plurality of switching transistors connected to respective picture elements.

2. Description of Prior Art

Conventionally, any matrix-type liquid crystal display panel provided with a plurality of switching transistors connected to each picture element can produce a sharp contrast substantially equivalent to a static driver system even when executing multi-line multiplex driving using a low duty ratio. Thus, the matrix-type liquid crystal display panel normally uses the circuit construction and signal waveforms shown in FIG. 1 (A) and (B). In FIG. 1, reference number 11 indicates a liquid crystal display panel, in which switching transistor 11-c is connected to the respective crossing points of the row electrode 11-a and the column electrode 11-b.

Reference number 11-d indicates the liquid crystal layer between the picture elements and the opposing electrodes. Reference number 12 indicates the row electrode driver substantially comprised of shift registers delivering scan pulses y1 through Yn to each row electrode by operation of the clock pulse $\phi 1$ to sequentially shift the scan-start pulse P sent from signal control circuit 13. Reference number 14 indicates the column electrode driver substantially comprised of shift-registers, a sample-hold circuit, and a output-buffer circuit which outputs data signals X1 through Xm each having an amplitude corresponding to the shade depth of the display. Column electrode driver 14 samples the data voltages during a specific period when dealing with the picture elements of the corresponding column from a variety of display data delivered in series from data control circuit 15. Column electrode driver 14 then holds the value of the sampled data voltage for a specific period of time before delivering the sampled value to the 1-H (one-scan period) column electrode in sync with clock pulse 01. Data control circuit 15 functions as the video receiver circuit as well as the signal processor circuit for displaying TV pictures. FIG. 2 (A) shows a typical example of a circuit dealing with the Xi-element of the column electrode driver. FIG. 2 (B) shows the typical waveforms generated by this circuit, in which control signals T and CL are respectively delivered to all columns. Reference numbers 21 through 24 indicate the respective analog switches that are activated when the control signals Si, T, and CL are High. First, when control signal Si is High, analog switch 21 is activated only during the 1-H period. The voltage of the display data D is then sampled by capacitor 25 during this period, followed by the execution of sequential sampling of the voltages from all the columns.

After completing the sampling from all columns and before reactivating the sampling operation from the first column, analog switch 22 is activated during period T, thus causing capacitor 25 to transfer its voltage to capacitor 26, which then holds the voltage from capacitor 25 during the period when the next sampling is being performed. The voltage held by capacitor 26 is then delivered to the column electrode (being a load) through the output buffer circuit comprised of gate-insulated transistor 27. The load can be considered to be that of capacitor 28 which synthesizes all the free capacitances of the column electrode.

Analog switches 23 and 24, respectively cause capacitors 26 and 28 to discharge their loads so that the voltage stored in both capacitors will not adversely affect the voltage to be discharged in the next step.

When performing a picture display using a liquid crystal display panel provided with the configuration described above, in order to correctly drive the liquid crystals using AC current, two-time scanning must be normally applied as a unit. AC current is then applied to the liquid crystals by inverting the polarity of the data signals fed to the column electrodes in each scanning period. As a result, when displaying TV pictures, if the aim is to display TV pictures using 525 scan lines (identical to those of a conventional NTSC-transmission format television set) only one-half (15 Hz) of the frame frequency is applied to the liquid crystals since the TV picture has a frame frequency of 30 Hz. Thus, a flicker is unavoidably generated on the displayed picture. To compensate for this, a jump scanning operation employed by conventional television sets is used and the polarity is widely inverted against each field so that 30 Hz of the AC current can be constantly supplied to the liquid crystals.

However, when performing liquid crystal display using the same number of scan lines as a conventional television set, a conventional method must be applied since each field receives video signals only through either odd or even numbered scan lines. For example, the frame memory is first activated. Then the picture signals corresponding to one-half the total number of scan lines is read from the frame memory before eventually being delivered to the column electrode drivers. Although the frame memory is needed as described above, when displaying TV pictures using a conventional TV display unit, which incorporates a matrix-type liquid crystal display panel via 525 scan lines (identical to a conventional NTSC television set) the provision of such a frame memory results in increased power consumption and more expensive operating cost.

OBJECT AND SUMMARY OF THE INVENTION

1. Object of the Invention

In the light of the disadvantages mentioned above, the present invention aims to provide a unique and useful drive circuit for a liquid crystal display panel which has no frame memory at all but which stably displays pictures using the same number of scan lines used in conventional television sets.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

2. Summary of the Invention

To achieve the objective specified above, a preferred embodiment of the present invention provides means for realizing a display of stable TV pictures by employing the same number of scan lines as those used by conventional television sets but without using a frame memory at all. The display of stable TV pictures is realized by supplying the mean value of two video signals in both the 1-H advance and 1-H behind odd (even) number scan lines to liquid crystals, while the video signal in the odd (even) field matches the even (odd) number of scan lines.

BRIEF DESCRIPTION OF THE DRAWINGS

The present invention will be better understood from the detailed description given hereinbelow and the accompanying drawings which are given by way of illustration only, and thus are not limitative of the present invention wherein:

FIG. 1 (B) shows the waveforms of the main signals generated by the driver circuit shown in FIG. 1 (A);

FIG. 2 (B) shows the signal waveforms generated by the driver circuit shown in FIG. 2 (A);

FIGS. 5 (B) and 6 (B) show the signal waveforms generated by the driver circuit shown in FIG. 4;

FIG. 7 (B) shows the signal waveforms generated by the scan-start pulse generator shown in FIG. 7 (A).

DETAILED DESCRIPTION OF THE PREFERRED EMBODIMENTS

Figure 3:
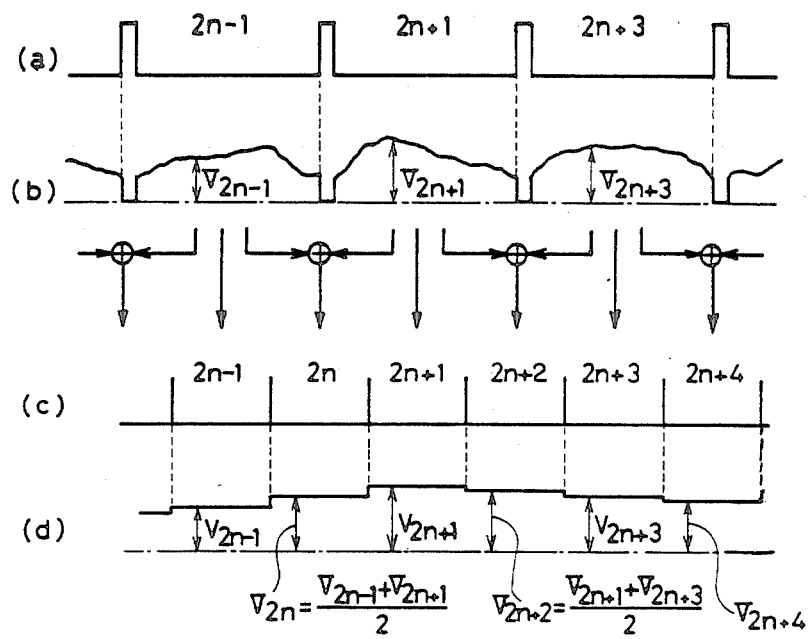
FIG. 3 shows the waveforms and the principle of the present invention.

As shown in FIG. 3, the matrix liquid crystal display panel drive circuit embodied by the present invention uses no frame memory at all, yet provides the function of displaying pictures having the same number of scan lines as that of any conventional television set. The display of stable pictures is realized by supplying the mean value of two video signals in both the 1-H advance and 1-H behind odd (even) number scan lines to liquid crystals, while the video signal in the odd (even) line field matches the even (odd) number of scan lines.

In FIG. 3, (a) and (b) denote respectively, the horizontal sync signal and video signal of the incoming TV signal, in which the odd-number field is typically shown. Thus, the video signal (b) contains only the signal dealing with the odd-number scanning. FIG. 3 (c) denotes the clock pulse $\phi 1$ generating the scan pulses.

Figure 4:
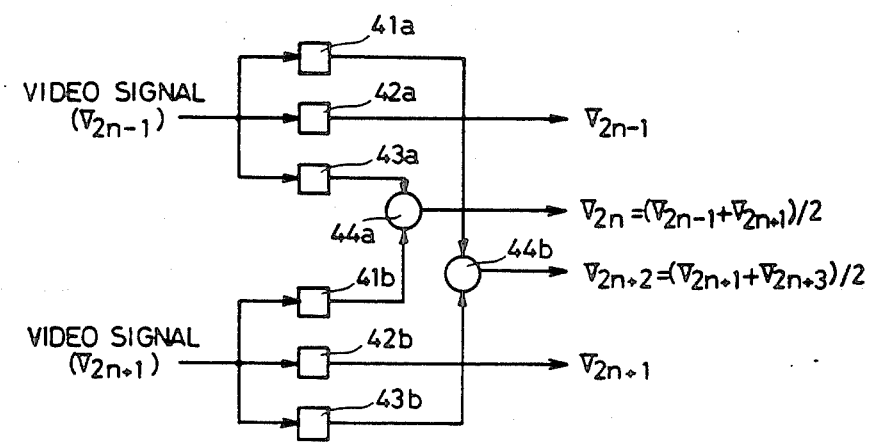
FIG. 4 is a schematic diagram showing the circuit construction of the column electrode driver of the driver circuit reflecting a preferred embodiment of the present invention.

Note that, since all the scan lines are repeatedly scanned by 60 Hz of the frequency, the effective period of the clock pulse $\phi 1$ is reduced to one-half the horizontal sync signal (a). FIG. 3 (d) denotes one of the data signals delivered to the column electrode. Since the signal voltage ($\ldots, V2n-1, V2n+1, V2n+3, \ldots$) transmitted from the video signal (b) is absent from the odd-number ($\ldots, 2n-1, 2n+1, 2n+3, \ldots$) scan period, and also since there is no video signal matching the even number ($\ldots, 2n, 2n+2, 2n+4, \ldots$) scan period, the mean value ($\ldots, V2n=(V2n-1+V2n+1)/2$, $V2n+2=(V2n+1+V2n+3)/2, \ldots$) of the signal voltages before and after these scan periods is denoted by the output waveforms. In the even field, the above signal voltage sent from the video signal is output during the even-number scan period, whereas the signal voltage produced by means of averaging is output during the odd-number scan period. Then, by inverting the polarity of the video signals in every field, the above signal voltages are combined together so that 30 Hz of the AC current can be securely delivered to the liquid crystals. FIG. 4 is a schematic diagram showing the circuit construction of the column electrode driver of the driver circuit available for generating the drive waveforms described above. Reference numbers 41, 42, and 43 respectively indicate the sample-hold circuit holding the voltage sampled from the video signals at a specific moment. These three circuits, 41a through 43a, respectively sample the same voltage. Circuit 41 averages the voltages of the 1-H advance video signals. Circuit 43 averages the voltages of the 1-H behind video signals. Circuit 42 outputs the sampled voltage. Either the "a" or "b" sample hold circuit performs sampling while the other outputs the average voltages. Reference number 44 indicates the circuits that average the two voltages. If this circuit has a construction capable of processing signals by analog means, the average value of the voltages can be obtained using a divider circuit comprised of capacitors to be described later. If digital signals are available, a digital operation circuit corresponding to reference number 44 will be employed. In this case, since the sampled voltage remains unaffected by the voltage averaging operation, all three sample-hold circuits can be made available as one unit.

Figure 1A:
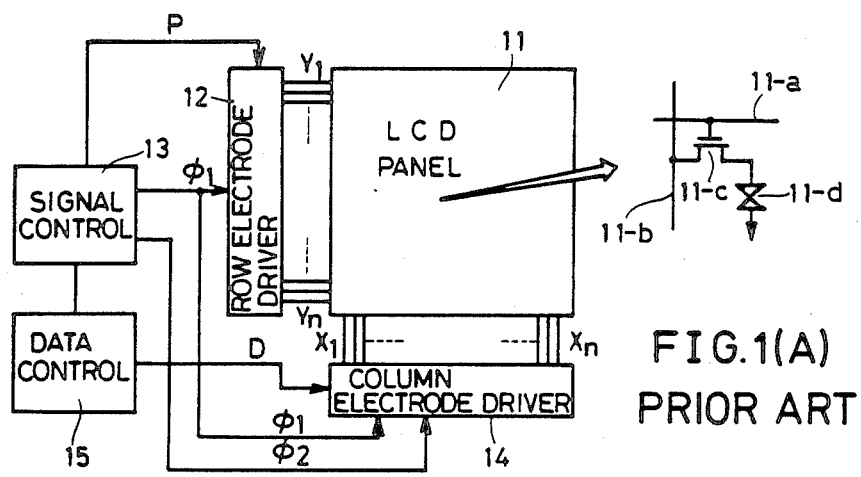
FIG. 1 (A) is a simplified block diagram of a conventional matrix type liquid crystal display panel driver circuit provided with switching transistors.
Figure 1B:
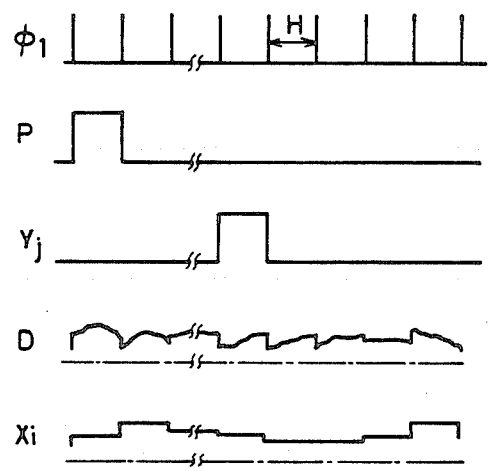
Figure 2A:
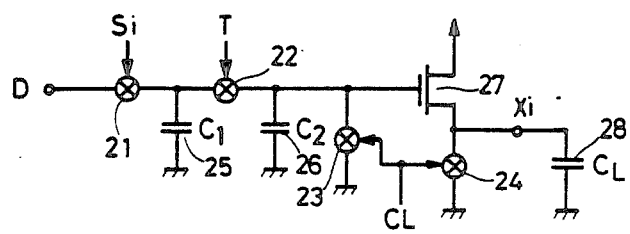
FIG. 2 (A) is a simplified block diagram of a conventional driver circuit of the column electrode driver dealing with one column.
Figure 2B:
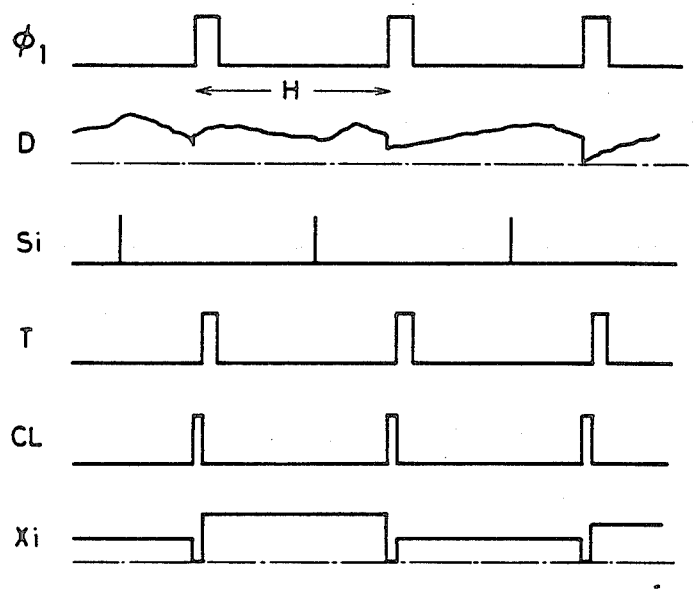
Figure 5A:
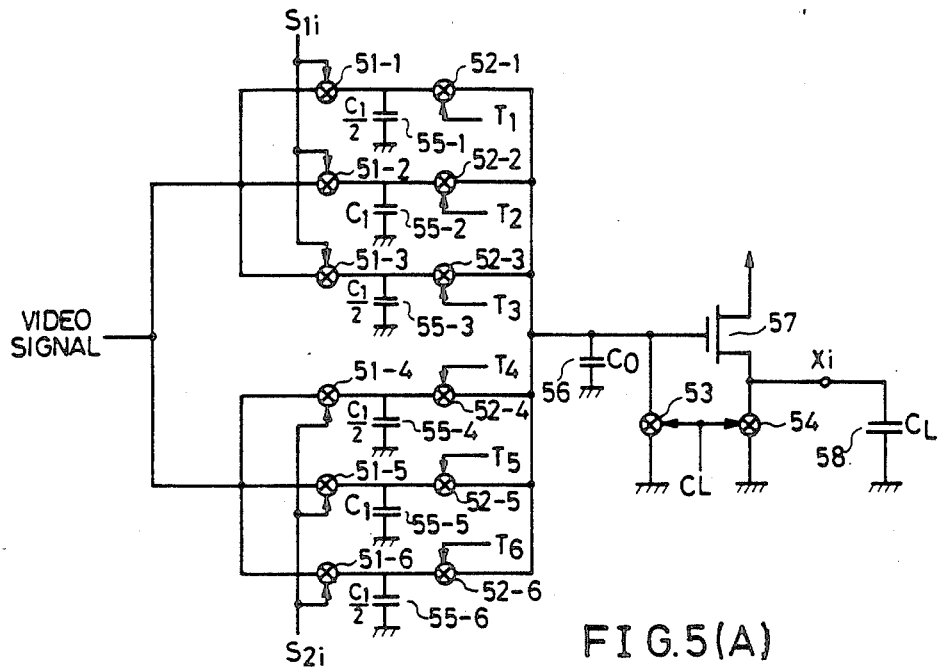
FIGS. 5 (A) and 6 (A) are schematic diagrams of the circuit of one column in the column electrode driver circuit reflecting the preferred embodiment of the present invention.
Figure 5B:
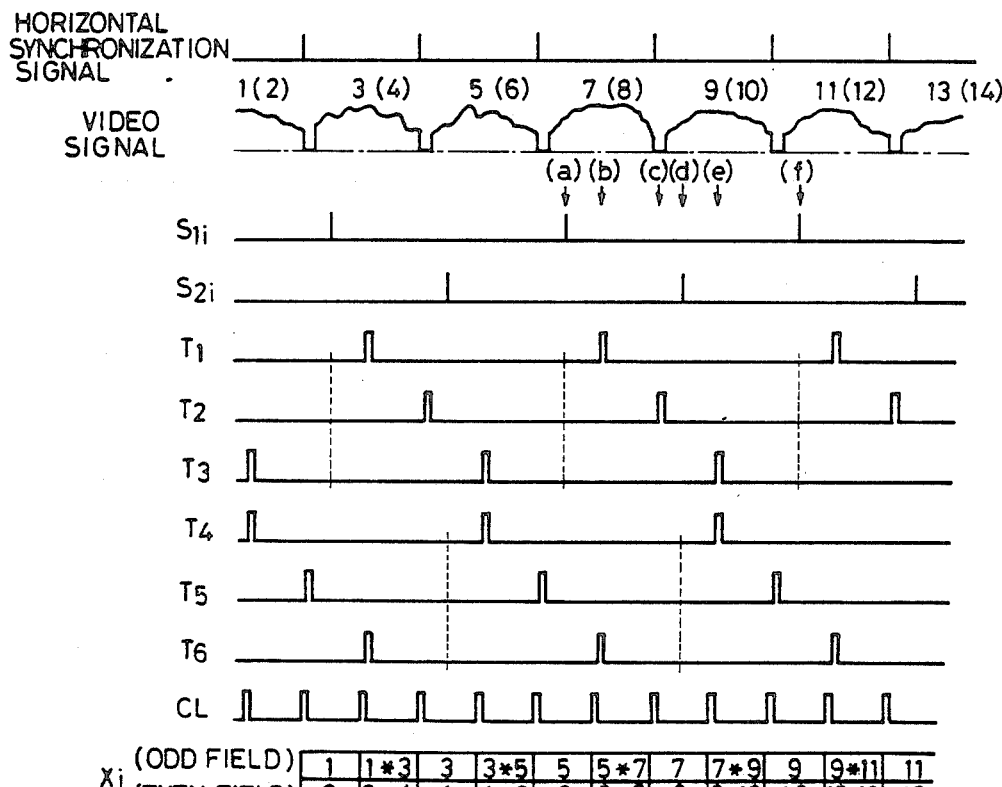

The matrix-type liquid crystal display panel driver circuit embodied by the present invention has a construction identical to that of the conventional driver circuits shown in FIGS. 1 (A) and 1 (B). However, the driver circuit embodied by the present invention has internal configurations of a column electrode driver and signal control circuit which are quite different from those shown in FIGS. 1 (A) and 1 (B). One of the preferred embodiments related to circuit Xi of the column electrode driver is shown in FIG. 5 (A). The driver circuit embodied by the present invention applies the principle shown in FIG. 4 to the conventional driver circuit shown in FIG. 2A. Therefore, the number of analog switches 51 and 52 and capacitors 55 of the sampling section has been increased six times over conventional systems.

Figure 6A:
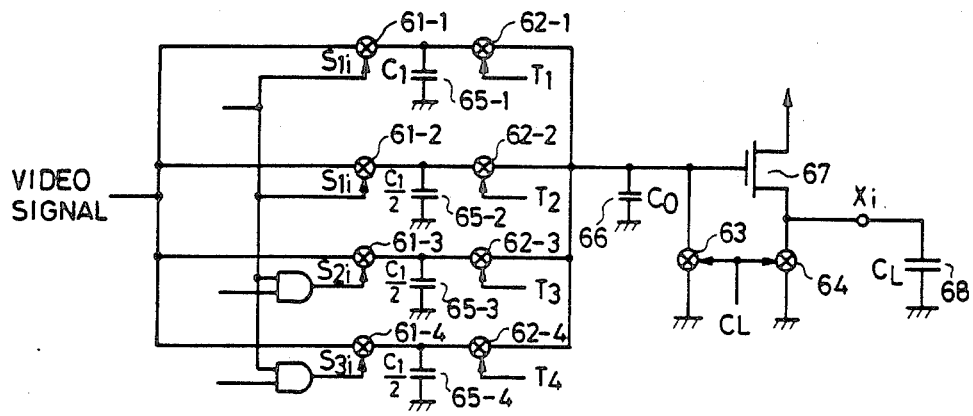
Figure 6B:
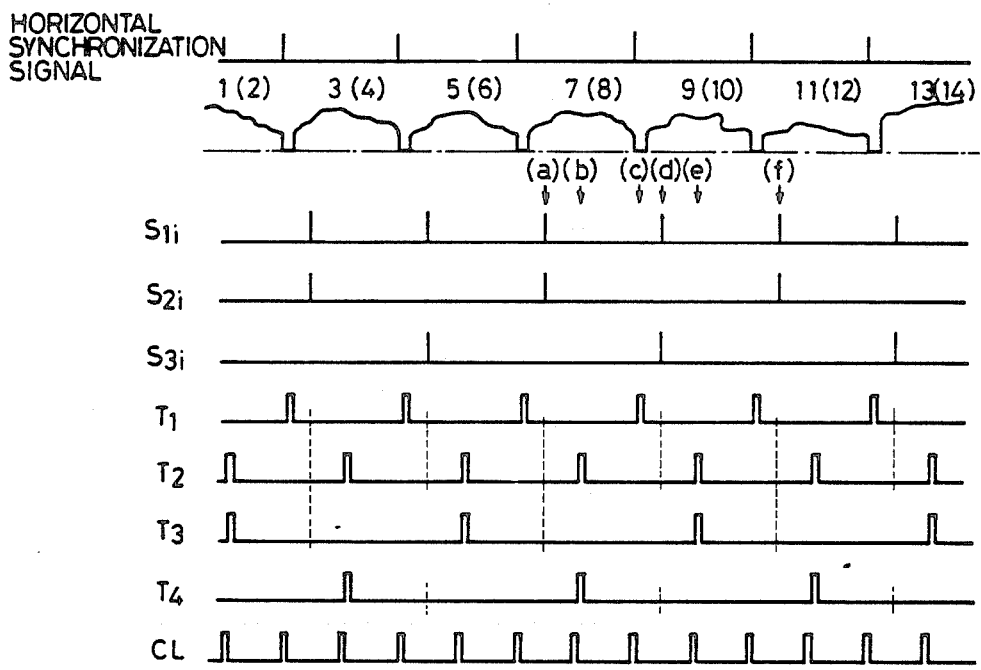
Figure 7A:
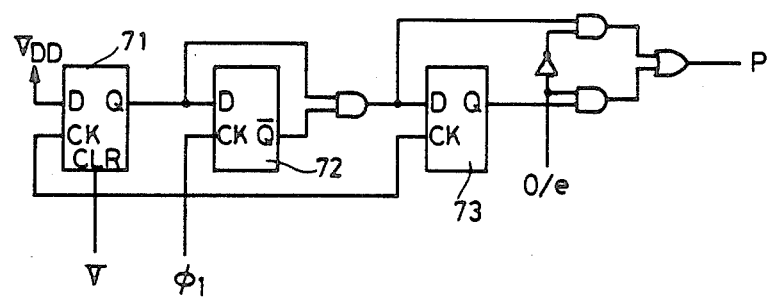
FIG. 7 (A) is a simplified circuit diagram of the scan-start pulse generator of the signal control circuit reflecting the preferred embodiment of the present invention.
Figure 7B:
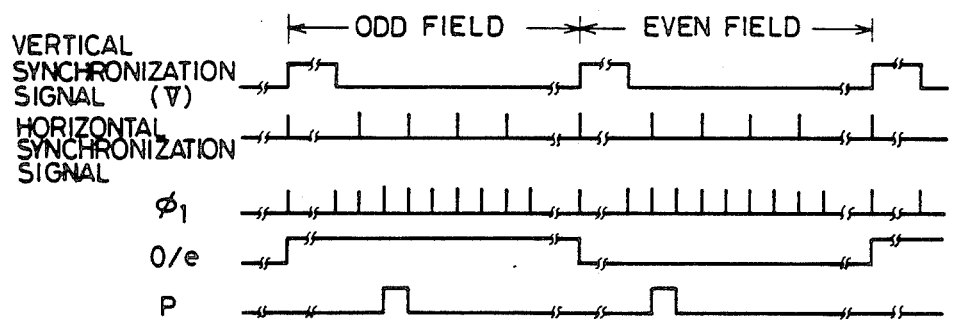

FIG. 5 (A) shows how the control signals T1 through T6 and CL are commonly made available for the respective columns. Referring now to FIG. 5 (B), consideration is given to the period during which the video signals matching the seventh scan line are received. As soon as all the instantaneous analog switches 51-1, 51-2, and 51-3 are activated by the control signal Sli at point (a), the video signal voltage V7i present at this moment is then sampled by the capacitors 55-1, 55-2, and 55-3. At the same time, the video signal voltage V5i matching the fifth scan line has been sampled and held by the capacitors 55-4, 55-5, and 55-6. When the analog switches 52-1 and 52-6 are activated by the control signals T1 and T6 at point (b), the capacitors 55-1 and 55-6 are connected in parallel to each other, thus causing (V5i+V7i)/2 of the voltage to be transferred to capacitor 56. This voltage, substantially being the video signal voltage matching the sixth scan line, is then delivered to load 58 via the buffer-functioning gate-insulated type transistor 57. When point (c) is reached, analog switch 52-2 is activated by the control signal T2, thus causing the voltage V7i stored in capacitor 55-2 to be transferred to capacitor 56 before being output from buffer 57. As soon as point (d) is reached, the analog switches 51-4, 51-5, and 51-6 are all activated by the control signal S2i to allow the video signal voltage V9i matching the ninth scan line to be sampled and held by the respective capacitors 55-4, 55-5, and 55-6. Next, as soon as analog switches, 52-3 and 52-4 are activated by the control signals T3 and T4 at point (e), capacitors 55-3 and 55-4 are connected to each other in parallel, thus causing $(V7i + V9i)/2$ of the voltage to be transferred to capacitor 56 before it is eventually output to load 58 as the video signal voltage matching the eighth scan line. As soon as point (f) is reached, the analog switches 51-1, 51-2, and 51-3 are again activated. The video signal voltage V11i matching the eleventh scan line is then sampled by the respective capacitors 55-1, 55-2, and 55-3. By repeating these operations, voltage Xi is delivered to load 58 following the sequence illustrated in FIG. 5 (B). Referring to FIG. 5 (B), numeral 3 indicates that the video signal matching the third scan line is output, whereas 3*5 indicates that the mean value of the third and fifth video signals is output as a video signal matching the fourth scan line. If capacitance Co of capacitor 56 shown in FIG. 5 (A) is significantly greater than capacitance C1 of capacitors 55-2 and 55-5, the voltages are reduced to $C1/(C1+Co)$ when the voltages stored in capacitors 55-2 and 55-5 are transferred to capacitor 56. As a result, capacitors 55-1, 55-3, 55-4, and 55-6 are respectively set at capacitance $C1/2$ so that the decreasing rate can be equally held even when the voltages from two capacitors are simultaneously transferred to capacitor 56. FIG. 6 (A) shows another preferred embodiment of the present invention, denoting a column electrode driver. Like the circuit shown in FIG. 5 (A), the drive circuit shown in FIG. 6(A) covers one column. Of the six units of the sampling circuits shown in the foregoing preferred embodiment, the latter embodiment has reduced the number of sampling circuits to four units which are mutually connected to each other. Thus, they are made commonly available to achieve a satisfactory timing relationship. The column electrode driver circuit reflecting this preferred embodiment is identical in operation to that performed by the foregoing preferred embodiment. Yet, this embodiment can correctly generate exactly the same output waveforms as with the foregoing embodiment while using fewer circuit elements. Therefore, it offers significant advantages in terms of circuit configuration. As shown in FIGS. 5 (B) and 6 (B), the column electrode driver embodied by the present invention causes the timing of output Xi to be deviate during a 1-H scan period between the odd and even fields (as seen from the reference horizontal sync signal). Thus, it is necessary to control the timing of the scan pulse so that the pulse can be correctly deviated in every field during the 1-H scan period. This can be easily realized by changing the timing of the scan-start pulse p in every field, which then enters row electrode driver 12 by virtue of the circuit configurations shown in FIG. 7 (A) and (B). Reference numbers 71, 72, and 73 respectively indicate flip flops.

The invention being thus described, it will be obvious that the same may be varied in many ways without departure from the spirit and scope of the invention, which is limited only by the following claims.

We claim:

1. A TV picture display unit comprising:
   a liquid crystal matrix display panel for displaying a picture from a plurality of television video signals corresponding to successive scan lines of a television picture frame; and
   driver circuit means for driving said matrix display panel with signals corresponding to said video signals, including,
   means for sampling video signals corresponding to alternate scan lines of said frame to provide successfully sampled signals,
   means for storing at least first and second successively sampled signals,
   means for forming a signal defining the mean value of said stored first and second successively sampled signals, and
   means for sequentially applying said stored first sampled signal, said mean value signal, and said stored second sampled signal to said matrix display panel corresponding to said successive scan lines of said television picture frame,
   said means for storing substituting each successively sampled signal for the oldest signal stored therein, said mean value signal corresponding to a scan line between successively sampled signals.

2. The display unit of claim 1, wherein said means for storing and means for forming comprise a plurality of capacitors connected in parallel with each other and in circuit with an input for said video signals.

3. The display unit of claim 1, wherein said means for sampling samples even numbered scan line signals during a first period, and odd numbered scan line signals during a second period, said first and second periods each being equal to one-half the period of an entire frame of scan line signals.

* * * * *